United States Patent
Meyer (10) Patent No.: US 6,425,056 B2
(45) Date of Patent: *Jul. 23, 2002

(54) METHOD FOR CONTROLLING A DIRECT MAPPED OR TWO WAY SET ASSOCIATIVE CACHE MEMORY IN A COMPUTER SYSTEM

(75) Inventor: James W. Meyer, Shoreview, MN (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/179,236

(22) Filed: Oct. 26, 1998

(51) Int. Cl.$^7$ .............................................. G06F 12/00
(52) U.S. Cl. ........................... 711/128; 711/154; 713/2; 365/49
(58) Field of Search ................................ 711/128, 118, 711/3, 120, 129, 170, 212, 108, 154; 365/49; 713/2, 100

(56) References Cited

U.S. PATENT DOCUMENTS

| | | | | |
|---|---|---|---|---|
| 4,928,225 A | * | 5/1990 | McCarthy et al. | 711/145 |
| 5,014,195 A | * | 5/1991 | Farrell et al. | 711/128 |
| 5,497,458 A | * | 3/1996 | Finch et al. | 714/30 |
| 5,548,742 A | * | 8/1996 | Wang et al. | 711/128 |
| 5,701,438 A | * | 12/1997 | Bains | 711/211 |
| 5,708,791 A | * | 1/1998 | Davis | 711/105 |
| 5,761,715 A | * | 6/1998 | Takahashi | 711/128 |
| 5,845,317 A | * | 12/1998 | Pawlowski | 711/128 |
| 5,900,012 A | * | 5/1999 | Tran | 711/120 |
| 5,978,888 A | * | 11/1999 | Arimilli et al. | 711/128 |

OTHER PUBLICATIONS

82430FX PCIset Datasheet 82437FX System Controller (TSC) and 82438FX Data Path Unit (TDP), Intel Corp, pp 14 & 45, Nov., 1996.*

* cited by examiner

Primary Examiner—Hong Kim
(74) Attorney, Agent, or Firm—Dorsey & Whitney LLP (57) ABSTRACT

A method is described for controlling a cache memory that may be either a direct-mapped or two-way set-associative cache. The described method is performed by a configurable cache controller. The cache controller receives a configuration signal having first and second states, with the configuration signal of the first state configuring the cache controller to monitor and control a direct-mapped cache, and the configuration signal of the second state configuring the cache controller to monitor and control a two-way set-associative cache. The cache controller includes first and second comparators, each able to compare respective first and second cache tags to a memory address. Both of the comparators are enabled when monitoring cache hits to a two-way set-associative cache, whereas only one of the comparators is enabled when monitoring a direct-mapped cache. The cache controller also includes first and second control circuits, each receiving a hit signal produced by a respective one of the comparators. Thus, both of these control circuits may operate when the cache controller monitors and controls a two-way set-associative cache, while only one of the control circuits will be selectively enabled when the cache controller monitors and controls a direct-mapped cache. The two-state configuration signal may be conveniently provided by a flip-flop or other programmable element whose value is set during computer system initialization routines.

15 Claims, 5 Drawing Sheets

METHOD FOR CONTROLLING A DIRECT MAPPED OR TWO WAY SET ASSOCIATIVE CACHE MEMORY IN A COMPUTER SYSTEM

CROSS-REFERENCE TO RELATED APPLICATIONS

This application is somewhat related to co-pending, commonly owned U.S. patent application Ser. No. 09/179,235, filed Oct. 26, 1998.

TECHNICAL FIELD

The present invention relates generally to circuitry and protocols associated with operating cache memory in a computer system, and more particularly, to methods for controlling variously configured cache memory in a computer system.

BACKGROUND OF THE INVENTION

As processor speeds have rapidly increased in today's computer systems, the speed of economical memory devices has increased at a much slower pace. Thus, to take full advantage of the improved performance of today's faster and more powerful processors, faster and more expensive memory devices must be used. In order to reduce costs, however, most computer systems include a main memory populated by relatively economical (and slow) memory devices and a smaller cache memory populated by relatively expensive (and fast) memory devices. Commonly, the economical memory devices used in the main memory include dynamic random access memory devices (DRAMs), and the more expensive memory devices used in the cache include static random access memory devices (SRAMs). During computer system operation, the cache memory stores a subset of the data stored in the main memory. When a processor requests access to data stored in the main memory, that data may be more quickly provided if a copy is resident in the cache memory.

Figure 1:
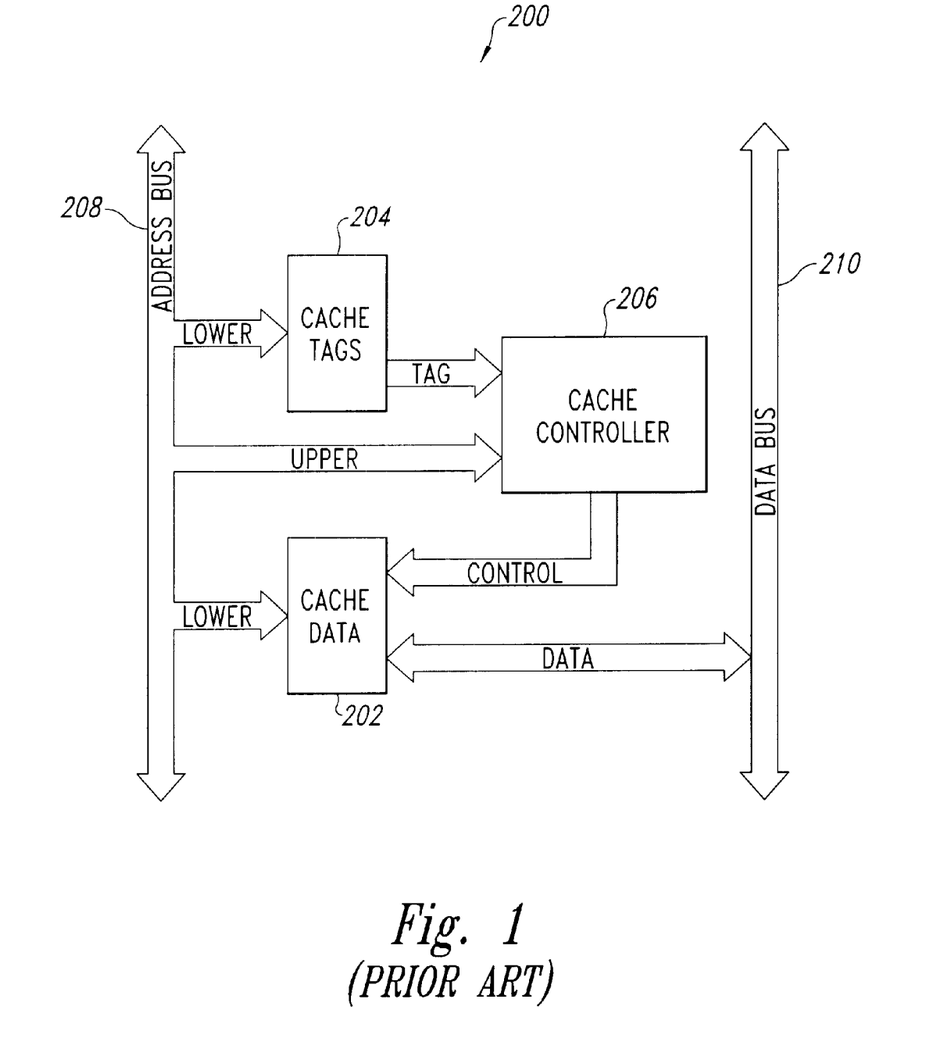
FIG. 1 is a functional block diagram depicting a cache memory subsystem in accordance with the prior art.

Referring to FIG. 1, a prior art cache memory subsystem 200 is depicted. The cache memory subsystem 200 includes a cache data array 202 that stores a subset of data stored in a computer system's main memory. A cache tag array 204 stores tag data associated with main memory addresses of the data currently copied in the cache data array 202. A cache controller 206 is coupled with the cache data array 202 and the cache tag array 204 to monitor and control operation thereof.

When a processor wishes to read data from main memory, it drives an address on an address bus 208, which is coupled with the cache memory subsystem 200. A lower portion of the address bits carried on the address bus 208 indicate which of the various lines in the cache data array 202 may include a copy of the requested data. The lower portion of the address is applied to the cache tag array 204, which responsively produces a corresponding tag value stored in the cache tag array. This tag value corresponds with the upper address bits of the data copied in the cache data array 202. The cache controller 206 includes comparison circuitry (not shown) that compares the tag data output by the cache tag array 204 with an upper portion of the address bits carried on the address bus 208. In the event the tag data and the upper portion of the address bits match (known as a "cache hit"), the cache controller 206 applies a plurality of control signals controlling access to the requested data copied in the cache data array 202. The requested data is then provided to the processor via a data bus 210 coupling the processor with the cache memory subsystem 200.

As is known to those skilled in the art, a wide variety of cache system configurations or organizations are commonly available for inclusion in computer systems. For example, a "direct-mapped" cache system is organized such that for each addressed location in main memory, there exists one and only one location in the cache data array that could include a copy of such data. In a "two-way set-associative" cache system, the cache is configured such that for any one addressed location in main memory, there exists two possible locations within the cache data array that might include a copy of such data. Typically, cache controller circuitry that monitors and controls a direct-mapped cache configuration is quite different from cache controller circuitry that monitors and controls a two-way set-associative cache configuration.

For the purposes of computer system performance and cost trade off studies, it is important that more than one cache configuration design be available for testing in a given computer system. Ideally, reconfiguration of the cache memory system would be straightforward and inexpensive to reduce testing time and expense. In today's computer systems, different cache memory configurations require different cache controller hardware. This requires two or more separate system design revisions to be developed in order to test multiple cache memory configurations in a given computer system. This leads to longer design cycles and, if more than one cache configuration is to be included in manufactured products, additional inventory must be maintained. In the case of today's computer systems including the Intel Pentium-type processors, different L2 cache configurations require different motherboard designs with significantly different components. Computer systems having readily reconfigurable cache memory subsystems are not currently available.

SUMMARY OF THE INVENTION

In accordance with the present invention, a method is provided for controlling a cache memory in a computer system. The method includes determining in which of first and second cache configurations the cache memory is organized. A memory address is received, and corresponding tag data stored in the cache memory is then retrieved. If the cache memory is of the first configuration, then first tag data are retrieved and compared to the memory address. If the cache memory is of the second cache configuration, then second tag data are retrieved and compared to the memory address.

The first and second cache configurations may be direct-mapped and two-way set-associative configurations, respectively. Determining cache configuration may include receiving a configuration signal and determining which of first and second states the signal has. The first and second tag data may be compared to different first and second portions of the memory address, respectively. If the cache memory is of the second configuration, the first tag data may be retrieved and compared to the second portion of the memory address.

DETAILED DESCRIPTION OF THE INVENTION

The following describes a novel method for controlling a cache memory in a computer system. Certain details are set forth to provide a sufficient understanding of the present invention. However, it will be clear to one skilled in the art, that the present invention may be practiced without these particular details. In other instances, well-known circuits, control signals, timing protocols, and software operations have not been shown in detail in order to avoid unnecessarily obscuring the invention.

Figure 2:
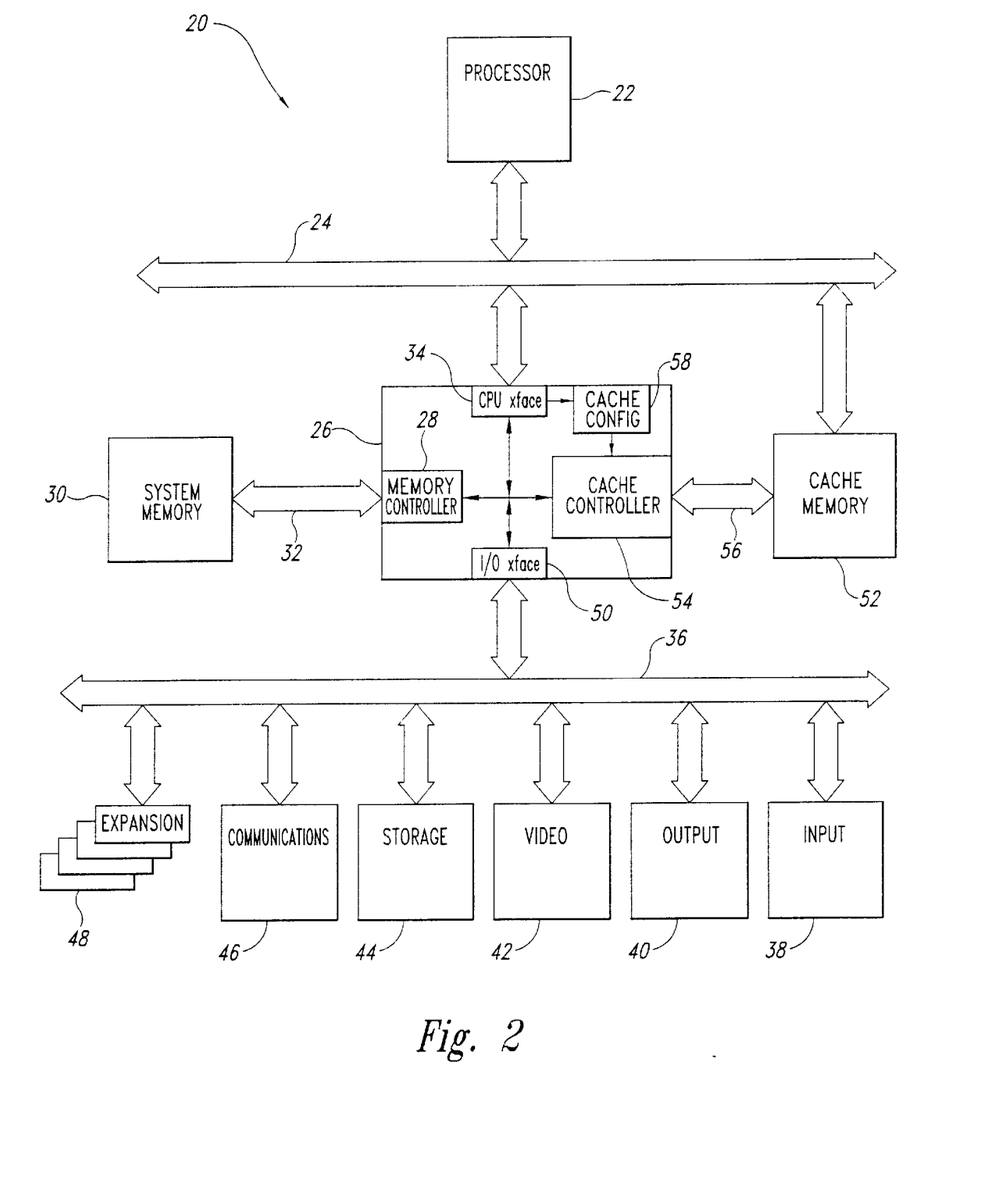
FIG. 2 is a functional block diagram depicting a computer system adapted to perform a method in accordance with an embodiment of the present invention.

FIG. 2 shows a computer system 20 that is adapted to perform a method in accordance with an embodiment of the present invention. A central processing unit (CPU), such as a microprocessor 22, is coupled with a system controller 26 (also known as corelogic) by a host or processor bus 24 that carries address, data and control signals therebetween. The system controller 26 includes a memory controller 28 for accessing a system memory 30 via a memory bus 32. The microprocessor 22 may be any of a wide variety of processors, such as Pentium-type processors manufactured by Intel or other x86-type architecture processors manufactured by AMD, Cyrix, and others. The system memory 30 may include any of a wide variety of suitable memory devices. Example memory devices include DRAMs manufactured by Micron Technology, Inc., such as asynchronous DRAMs, synchronous DRAMs, SLDRAMs, etc. The system controller 26 also includes CPU interface circuitry 34 that couples the microprocessor 22 with other components of the system controller.

The system controller 26 also functions as a bridge circuit (sometimes called the host bus bridge or North bridge) between the processor bus 24 and a system bus, such as I/O bus 36. The I/O bus 36 may itself be a combination of one or more bus systems with associated interface circuitry (e.g., AGP bus and PCI bus with connected SCSI and ISA bus systems). Multiple I/O devices 38–46 are coupled with the I/O bus 36. Such I/O devices include a data input device 38 (such as a keyboard, mouse, etc.), a data output device 40 (such as a printer), a visual display device 42 (commonly coupled with the system controller 26 via a high speed PCI or AGP bus), a data storage device 44 (such as a disk drive, tape drive, CD-ROM drive, etc.), and a communications device 46 (such as a modem, LAN interface, etc.). Additionally, expansion slots 48 are provided for future accommodation of other I/O devices not selected during the original design of the computer system 20.

FIG. 2 depicts the computer system 20 as including a single microprocessor 22, a single system memory 30, and a single system controller 26, with the various I/O devices 38–46 being coupled with the system controller via a single shared I/O bus 36 and an I/O interface 50 integrated within the system controller. Those skilled in the art will appreciate that the computer system 20 could include multiple processors, memory systems, system controllers, and bus systems. Also, those skilled in the art will understand that one or more of the I/O devices 38–46 may have separately dedicated interface connections, in which case the single depicted I/O interface 50 will be understood as a representation for a plurality of separately dedicated and adapted I/O interfaces. Alternatively, one or more of the I/O devices 38–46 may be coupled with the system controller 26 via a multiple bus and bridge network. Indeed those skilled in the art will understand the depiction of FIG. 2 to encompass any of a wide variety of computer systems including processing circuitry, memory circuitry, I/O circuitry, controller circuitry, bridge/network circuitry, and associated interconnections.

The computer system 20 also includes a cache memory 52 coupled with the processor bus 24 and with the system controller 26. The cache memory 52 may include any of a wide variety of suitable high-speed memory devices, such as synchronous SRAM modules manufactured by Micron Technology, Inc. A cache controller 54 is integrated within the system controller 26 and controls operations of the cache memory 52 via a control bus 56. In accordance with the present invention, the cache controller 54 is easily reconfigurable to control operations to any of a plurality of configurations or organizations of the cache memory 52. In one embodiment, the cache controller 54 is configurable by a programmable configuration control circuit 58 integrated within the system controller 26. During power-on self-test and system initialization operations, the microprocessor 22 determines the configuration of the cache memory 52 and correspondingly programs the cache configuration control circuit 58 to set the configuration control of the cache controller 54.

Figure 3:
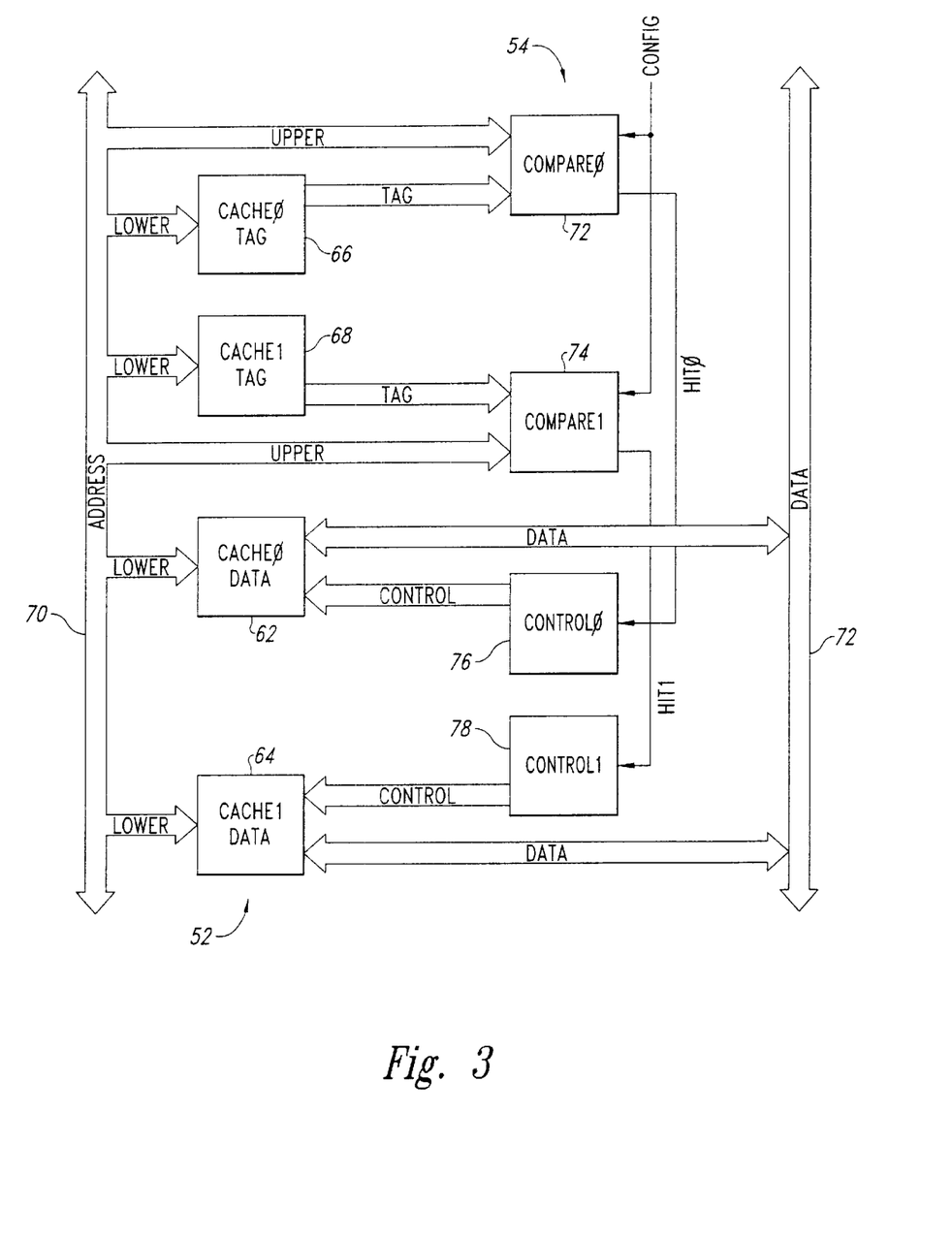
FIG. 3 is a functional block diagram depicting certain details of a cache memory and a cache controller included in the computer system of FIG. 2.

FIG. 3 depicts certain details of the configurable cache controller 54 and the cache memory 52. In this particular depiction, a cache controller is shown which can be readily configured to address a direct-mapped or a two-way set-associative cache memory configuration. Those skilled in the art will appreciate, however, that the principles described in connection with this embodiment may be readily extended to provide cache controller circuitry that is configurable to control cache memories in any of a wide variety of known or future-developed configurations.

Referring to FIG. 3, the cache memory 52 may include first and second cache data arrays 62 and 64 respectively. A first cache tag array 66 is associated with the first cache data array 62, and a second cache tag array 68 is associated with the second cache data array 64. Each of the cache data arrays 62, 64 is coupled with an address bus portion 70 and a data bus portion 72 of the processor bus 24 shown in FIG. 2 in one embodiment, the cache memory 52 is a one megabyte direct-mapped cache with a 32 byte (four quadword) line width. The data bus carries 64 parallel data bits (one quadword), and the cache data array 62 includes four 32k×64 SRAM memory devices. The associated first cache tag array 66 includes a 32k×8 SRAM device with processor address bits A5–A19 being the lower portion of the address that is applied to the first cache tag array 66 to select one of the 32k cache lines. The tag data output by the cache tag array 66 then corresponds to address bits A20–A27. The lower portion of the address applied to the first cache data array 62 corresponds with processor address bits A3–A19, with address bits A3 and A4 used to select one of the four quadwords stored in each cache line.

In the direct-mapped configuration of the cache memory 52, the second cache data array 64 and associated cache tag array 68 either do not exist or are circuits that are disabled. In another embodiment, the cache memory 52 is a one megabyte two-way set-associative cache with a 32 byte line width. In this case, both the first and second cache data array 62 and 64 and associated cache tag arrays 66 and 68 are populated. Each of the cache data arrays 62 and 64 includes two 32k×64 SRAM memory devices, and each of the cache tag array 66 and 68 includes a 16k×8 SRAM device. In this case, the processor address bits A5–A18 are applied to the cache tag arrays to address the 16k lines in the cache. The cache data arrays 62 and 64 receive the processor address bit A3–A18 applied thereto, with address bits A3 and A4 used to select one of four quadwords of data stored in each cache line. In this two-way set-associative configuration, the tag data output by the cache tag array 66 and 68 corresponds with address bits A19–A26.

The cache controller 54 includes first and second comparators 72 and 74, respectively. The first comparator 72 receives the tag data from the cache tag array 66 and compares it with the associated upper portion of the address carried on the address bus 70. The second comparator 74 receives the tag data from the cache tag array 68 and compares it with the associated upper portion of the address on the address bus 70. A configuration signal is applied to each of the first and second comparators 72 and 74 by the configuration control circuit 58 (see FIG. 2). The configuration signal selectively enables the first and second comparators 72 and 74. In particular, the configuration signal has first and second states, with the first state enabling solely the first comparator 72 and the second state enabling both the first and second comparators 72 and 74. In this way, the configuration signal of first and second states selectively enables comparators for comparing tag data output by tag caches associated with either a direct-mapped or two-way set-associative cache configuration.

The cache controller 54 also includes first and second control circuits 76 and 78, respectively. The first control circuit 76 is enabled in response to a comparison match or asserted hit signal produced by the first comparator 72. The second control circuit 78 is enabled in response to a comparison match or asserted hit signal produced by the second comparator 74. Each of the control circuits 76 and 78 is coupled with a respective one of the first and second cache data arrays 62 and 64 and controls the operations thereof.

When the configuration signal has the first state, the first comparator 72 is enabled, while the second comparator 74 is disabled. Thus the second control circuit 78 will never receive an applied hit signal and is likewise disabled. When the configuration signal has the second state, both the first and second comparator 72 and 74 are enabled, and each of the control circuits 76 may be selectively enabled in response to an asserted hit signal produced by a respective one of the comparators. As is well known to those skilled in art, each of the first and second control circuits 76 and 78 produces a plurality of well-known control signals in a well-known sequence to control access to data stored in a respective one of the cache data arrays 62 and 64. Examples of such well-known control signals include the various cache write enable signals, the cache output enable signal, byte write enable signals, chip select signals, synchronous address status control signals, etc.

As described above, the upper portion of the address corresponding to the output tag data may vary depending upon the particular cache configuration. In the above-described exemplary embodiments, therefore, the first comparator 72 compares the tag data output by the first cache tag data array 66 to a first upper portion of the address in response to a configuration signal of the first state and to a second upper portion of the address in response to a configuration signal of the second state.

Figure 4:
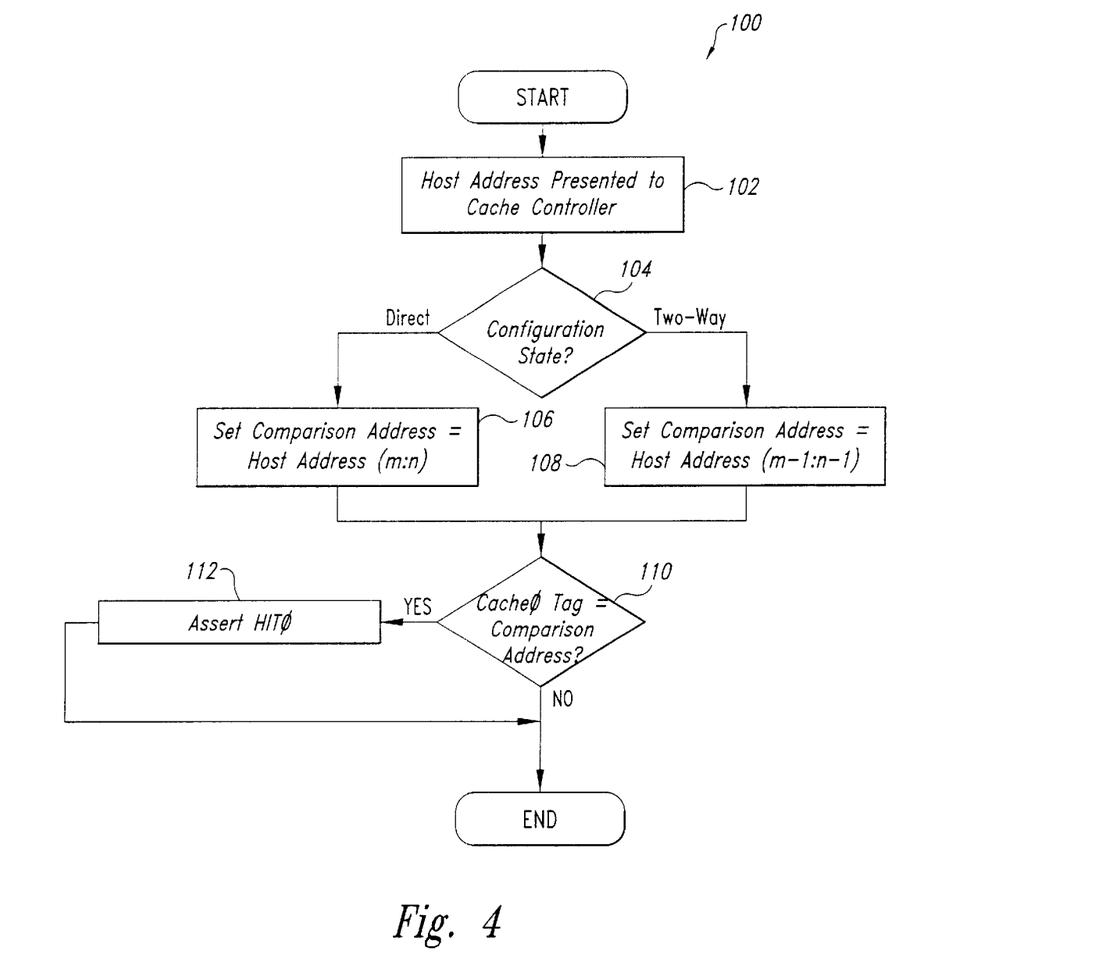
FIGS. 4 and 5 are process flow diagrams depicting a method of controlling a cache memory in accordance with an embodiment of the present invention.
Figure 5:
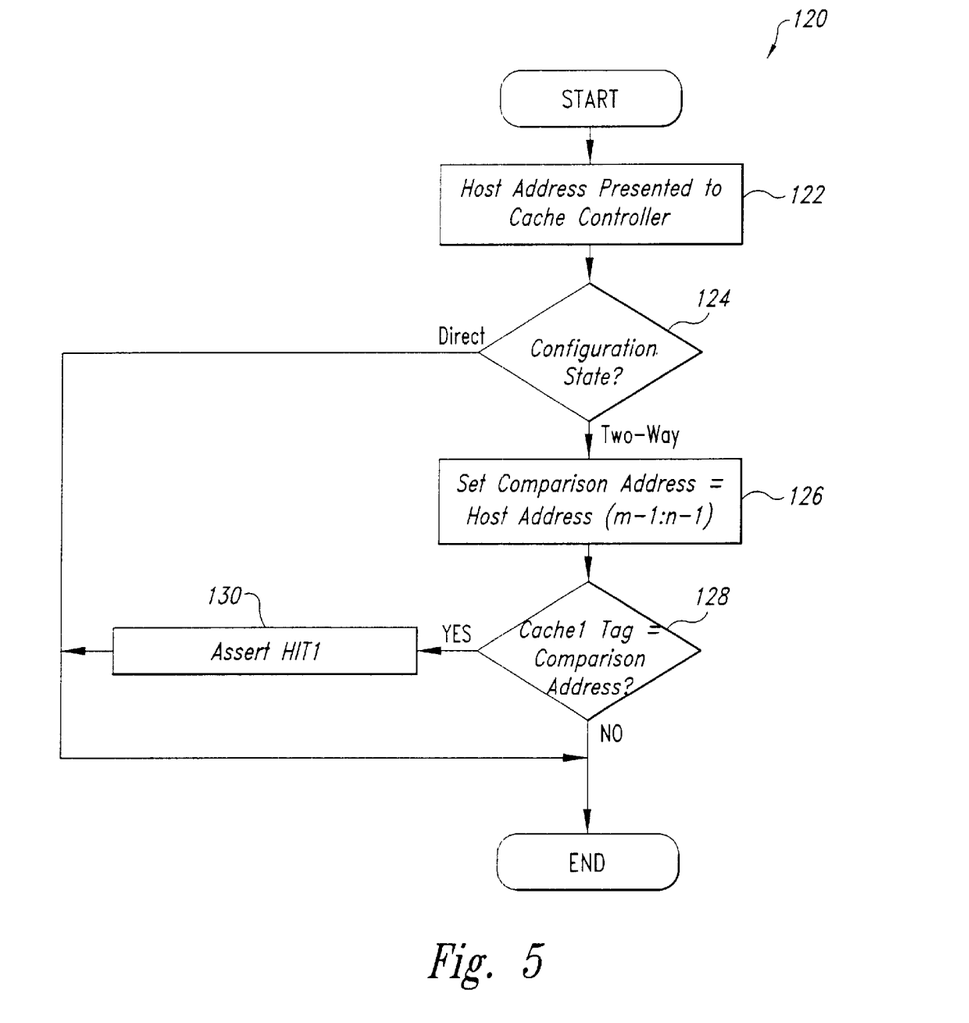

Referring to FIGS. 4 and 5, process flow charts depict operations 100 and 120 that are included in a method of controlling a cache memory in accordance with an embodiment of the present invention. The operations 100 and 120 may be performed using the circuitry described above in connection with FIGS. 2 and 3. Referring to FIG. 4, operations 100 begin at step 102 with receipt of an address, such as by presentation of the address to the cache controller 54 on the address bus portion 70 of the processor bus 24. In conditional branch test step 104, a determination is made of the cache configuration, such as by determining the state of the cache configuration signal. If the configuration is a direct-mapped cache configuration, a comparison address is set in step 106 to be a first upper portion of the address. If the configuration is instead a two-way set-associative cache configuration, the comparison address is set in step 108 to be a second upper portion of the address. Following either of steps 106 or 108, a conditional branch test is performed in step 110, in which it is determined whether tag data (such as that output by the first cache tag array 66) matches the respective first or second upper portions of the address. If a match occurs, data transfer operations are initiated in step 112, such as by the first comparator 72 asserting the hit signal to enable operations of the first control circuit 76. If a match does not occur, the hit signal remains deasserted. Operations 100 then cease pending receipt of another address.

Referring to FIG. 5, operations 120 also begin upon receipt of the address at step 122. In conditional branch test step 124, the cache configuration is determined. If the configuration is the direct-mapped cache configuration, operations 120 end, with, for example, the second comparator 74 producing a deasserted hit signal. If the configuration is instead the two-way set-associative cache configuration, the comparison address is set in step 126 to be the second upper portion of the address. A conditional branch test is then performed at step 128, in which it is determined whether tag data (such as that output by the second cache tag array 68) matches the second upper portion of the address. If a match occurs, data transfer operations are initiated in step 130, such as by the second comparator 74 asserting the hit signal to enable operations of the second control circuit 78. If no match occurs, the hit signal produced by the second comparator 74 remains deasserted. Operations 120 then cease pending receipt of another address.

Those skilled in the art will appreciate that the above-described embodiment of the cache controller 54 provides a readily configurable cache controller that can control both direct-mapped and two-way set-associative cache configurations via a two-state programmed configuration control circuit, such as a simple flip-flop. Alternatively, the comparators 72 and 74 could themselves include a register input programmed upon system initialization to selectively enable operations during subsequent system operations. While the above-described embodiment shows a programmable reconfigurable cache controller that can be configured to address one of two cache system configurations, those skilled in the art will appreciate that the above-described principles can be extended to other cache configurations.

While the present invention has been described in connection with reading data stored in a cache memory, those skilled in the art will understand the operation of the above-described circuitry and associated protocols may also be used in connection with writing data to a cache memory. Therefore, a detailed description of such write operations is neither required nor provided. Those skilled in the art will also understand that while a cache memory is typically implemented with separate cache tag and cache data memory devices, such separation is functional only and can instead be implemented within a single memory device or array structure. Similarly, while a two-way set-associate cache memory is commonly implemented with two separate cache tag memory devices and two separate cache data devices, other functionally equivalent implementations are possible. Thus, the present invention is not limited solely to methods for controlling cache memory systems having multiple and physically distinct memory devices or arrays, but instead encompasses cache memory systems having a wide variety of configurations that may be particularly implemented in a wide variety of ways.

Those skilled in the art will appreciate that the present invention may be accomplished with circuits other than those depicted and described in connection with FIGS. 2 and 3. These figures represent just one of many possible implementations of a configurable cache controller that may be programmed to monitor and control a variety of cache memory configurations. Those skilled in the art will also understand that each of the circuits whose function, method of operation, and interconnection is described in connection with FIGS. 2 and 3 is of a type known in the art. Therefore, one skilled in the art will be readily able to adapt such circuits in the described combination to practice this invention. Particular details of these circuits are not critical to the invention, and a detailed description of the internal circuit operation need not be provided. Similarly, each one of the process steps described in connection with FIGS. 4 and 5 is of a type well-known in the art, and may itself be a sequence of operations that need not be described in detail in order for one skilled in the art to practice the invention.

It will be appreciated that, although specific embodiments of the invention have been described for purposes of illustration, various modifications may be made without deviating from the spirit and scope of the invention. Those skilled in the art will appreciate that many of the advantages associated with the circuits and processes described above may be provided by other circuit configurations and processes. Indeed, a number of suitable circuit components can be adapted and combined in a variety of circuit topologies to implement methods of controlling variously configured cache memories in accordance with the present invention. Accordingly, the invention is not limited by the particular disclosed embodiments, but instead the scope of the invention is determined by the following claims.

What is claimed is:

1. A method of controlling a cache memory in a computer system, comprising:
   determining in which of first and second configurations the cache memory is organized during at least one of a plurality of power-on self-test and system initialization operations of the computer system;
   generating a configuration signal using a configuration control circuit based on a result of the determination, the configuration signal indicating whether the cache memory is in the first or second configuration;
   receiving a memory address;
   transmitting the configuration signal to first and second comparators;
   if the cache memory is of the first configuration, then enabling the first comparator to retrieve first tag data stored in the cache memory, and comparing the first tag data to the memory address using the first comparator; and
   if the cache memory is of the second configuration, then enabling both the first and second comparators to retrieve first and second tag data, respectively, stored in the cache memory, and comparing the first and second tag data to the memory address using the first and second comparators, respectively.

2. A method according to claim 1 wherein the first tag data is compared to a first portion of the memory address, and wherein the second tag data is compared to a second portion of the memory address.

3. A method according to claim 1 wherein if the cache memory is of the second configuration, then the method further comprises retrieving the first tag data and comparing the first tag data to the memory address.

4. A method according to claim 1 wherein the first cache configuration is a direct-mapped cache configuration, and wherein the second cache configuration is a two-way set-associative cache configuration.

5. A method of controlling a cache memory in a computer system, comprising:
   determining in which of first and second cache configurations the cache memory is organized from a configuration signal that is determined during at least one of a plurality of power-on self-test and system initialization operations of the computer system;
   based on the configuration signal, programming a cache configuration control circuit to set a configuration control mode of a cache controller;
   receiving a memory address;
   transmitting the configuration control mode to first and second comparators;
   if the cache memory is organized in the first configuration, then:
      enabling the first comparator to retrieve first tag data stored in the cache memory at a location corresponding with the memory address; and
      comparing the first tag data using the first comparator to a first associated portion of the memory address;
   if the cache memory is organized in the second configuration, then:
      enabling both the first and second comparators to retrieve first and second tag data, respectively, stored in the cache memory at a location corresponding with the memory address; and
      comparing the first and second tag data to a second associated portion of the memory address using the first and second comparators, respectively.

6. A method according to claim 5 wherein if the cache memory is organized in the second configuration, then the method also comprises retrieving the first tag data and comparing the first tag data to the second associated portion of the memory address.

7. A method according to claim 5 wherein determining in which of first and second cache configurations the cache memory is organized includes receiving a configuration signal having one of first and second states respectively indicating the first and second cache configurations.

8. A method according to claim 5 wherein the first cache configuration is a direct-mapped cache configuration.

9. A method according to claim 5 wherein the second cache configuration is a plural-way set-associative cache configuration.

10. A method according to claim 5 wherein the first cache configuration is a direct-mapped cache configuration, and wherein the second cache configuration is a two-way set-associative cache configuration.

11. A method of controlling a cache memory in a computer system, comprising:
    initiating at least one of a plurality of power-on self-test and system initialization operations of the computer system;
    during at least one of the plurality of power-on self-test and system initialization operations, receiving a cache configuration signal having one of first and second states, one of the first and second states corresponding to a cache memory having a direct-mapped configuration and the other of the first and second states corresponding to a cache memory having a two-way set-associative configuration;

receiving a memory address;

if the cache memory is organized in the first configuration, then:
- enabling a first comparator to retrieve first tag data stored in the cache memory at a location corresponding with the memory address; and
- comparing the first tag data to a first associated portion of the memory address using the first comparator;

if the cache memory is organized in the second configuration, then:
- enabling the first comparator to retrieve first tag data, and enabling a second comparator to retrieve second tag data, the first and second tag data being stored in the cache memory at a location corresponding with the memory address; and
- comparing the first tag data using the first comparator, and comparing the second tag data using the second comparator, to first and second associated portions, respectively, of the memory address.

12. A method according to claim 11 wherein if the cache configuration signal has the second state, and the second tag data match the second associated portion, respectively, the method also comprises:
- transmitting an hit signal from the second comparator to a second control circuit; and
- applying a stored data to a data bus.

13. A method according to claim 11 wherein if the cache configuration signal has the first state, and the first tag data match the first associated portion, the method also comprises:
- transmitting an hit signal from the first comparator to a first control circuit; and
- applying a stored data to a data bus.

14. A method of controlling a cache memory in a computer system, comprising:

initiating at least one of a plurality of power-on self-test and system initialization operations of the computer system;

during at least one of the plurality of power-on self-test and system initialization operations, determining a cache configuration signal, the cache configuration signal having first and second states, one of the first and second states corresponding to a cache memory having a direct-mapped configuration and the other of the first and second states corresponding to a cache memory having a two-way set-associative configuration;

receiving a memory address;

if the cache configuration signal has the first state, then enabling a first comparator to retrieve first tag data stored in the cache memory at a location corresponding with the memory address;

if the cache configuration signal has the first state, then enabling the first comparator to select a first portion of the memory address;

if the cache configuration signal has the first state, then enabling the first comparator to compare the first tag data to the first portion of the memory address;

if the cache configuration signal has the second state, then enabling first and second comparators to retrieve first and second tag data stored in the cache memory at a location corresponding with the memory address;

if the cache configuration signal has the second state, then enabling first and second comparators to select first and second portions, respectively, of the memory address; and if the cache configuration signal has the second state, then enabling the first and second comparators to compare the first and second tag data to the first and second portions, respectively, of the memory address.

15. A method according to claim 14 wherein the cache configuration signal has the first state when the cache memory is configured as a direct-mapped cache, and wherein the cache configuration signal has the second state when the cache memory is configured as a two-way set-associative cache.

* * * * *